United States Patent
Slavin et al.

(10) Patent No.: US 9,035,633 B1
(45) Date of Patent: May 19, 2015

(54) SWITCHING POWER CONVERTER CONTROL

(75) Inventors: Keith Slavin, Beaverton, OR (US); Ravindranath Naiknaware, Portland, OR (US)

(73) Assignee: SunPower Corporation, San Jose, CA (US)

( * ) Notice: Subject to any disclaimer, the term of this patent is extended or adjusted under 35 U.S.C. 154(b) by 624 days.

(21) Appl. No.: 12/868,581

(22) Filed: Aug. 25, 2010

Related U.S. Application Data

(60) Provisional application No. 61/290,837, filed on Dec. 29, 2009.

(51) Int. Cl.
*G05F 1/00* (2006.01)

(52) U.S. Cl.
CPC .................................... *G05F 1/00* (2013.01)

(58) Field of Classification Search
CPC ..................................................... H01H 73/40
USPC ......... 323/282, 283, 284, 285, 272, 226, 270, 323/222, 290, 274, 312; 363/132, 89; 315/307, 308, 294
See application file for complete search history.

(56) References Cited

U.S. PATENT DOCUMENTS

| | | | | |
|---|---|---|---|---|
| 6,775,330 B2 * | 8/2004 | Bach et al. | .................... | 375/296 |
| 6,806,689 B2 * | 10/2004 | Schuellein et al. | ........... | 323/272 |
| 7,466,082 B1 * | 12/2008 | Snyder et al. | ............. | 315/200 A |
| 2006/0043954 A1 * | 3/2006 | Markowski | .................... | 323/283 |
| 2007/0210772 A1 * | 9/2007 | Sawtell | .......................... | 323/282 |
| 2009/0027025 A1 * | 1/2009 | Latham et al. | ................ | 323/283 |
| 2009/0079355 A1 * | 3/2009 | Zhou et al. | .................... | 315/246 |
| 2009/0128116 A1 * | 5/2009 | Noda | ............................ | 323/290 |
| 2009/0195224 A1 * | 8/2009 | Kim | ................................ | 322/28 |
| 2010/0109630 A1 * | 5/2010 | Latham et al. | ................ | 323/282 |
| 2010/0118571 A1 * | 5/2010 | Saint-Pierre | .................... | 363/89 |
| 2010/0308654 A1 * | 12/2010 | Chen | .............................. | 307/31 |

* cited by examiner

*Primary Examiner* — Matthew Nguyen
*Assistant Examiner* — Trinh Dang
(74) *Attorney, Agent, or Firm* — Grasso PLLC; Fred Grasso

(57) ABSTRACT

A method of operating a switching power converter may include determining an average value of a measured parameter for substantially each switching cycle, and adjusting a control parameter during substantially each switching cycle in response to a corresponding one of the average values. In one embodiment, the control parameter comprises a switch duty cycle, and the measured parameter comprises an output current. Determining the average value of the measured parameter may include obtaining a first sample of the measured parameter during a switching cycle, and calculating the average value of the measured parameter during the switching cycle in response to the first sample.

38 Claims, 5 Drawing Sheets

(Buck Converter)
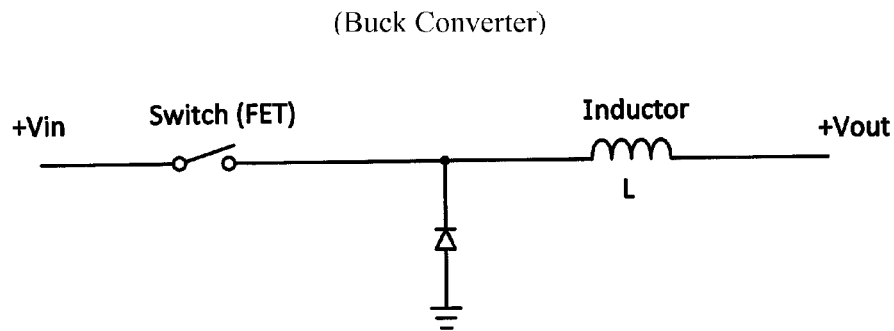
FIG. 2
FIG. 3A
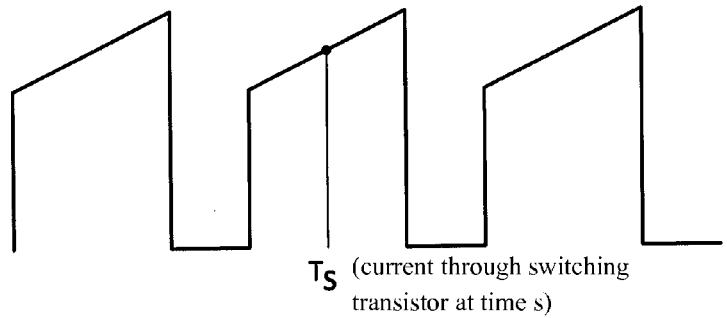
$T_s$ (current through switching transistor at time s)
FIG. 3B
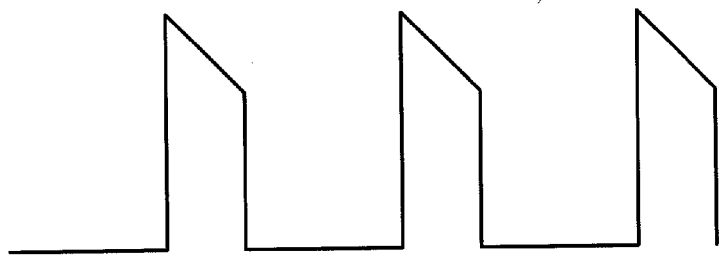
FIG. 3C
(Current waveforms through various components of the buck converter of Fig. 2)

US 9,035,633 B1

SWITCHING POWER CONVERTER CONTROL

CROSS-REFERENCE TO RELATED APPLICATIONS

This application claims priority from U.S. Provisional Patent application Ser. No. 61/290,837 filed Dec. 29, 2009, which is incorporated by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Control systems for switching power converters typically process a feedback signal from the converter with a digital or analog low-pass filter prior to using the feedback signal for a closed-loop control algorithm. Filtering the feedback signal, however, may increase the system response time and introduce noise, distortion and/or instability, etc. This degradation of system performance may be especially problematic in applications where the power converter is required to generate output waveforms having large dynamic range and/or bandwidth, or where large, unpredictable transients must be accommodated. For example, in applications where a battery, photovoltaic (PV) panel, fuel cell, or other DC power source must be coupled to an AC power grid, an inverter may be required to generate a 120 Hz rectified sine wave output current which is then converted to an AC sine wave through a bridge circuit. The rectified sine wave has sharp reversals (valleys) in the waveform which require a control loop having a very high bandwidth to accurately generate this waveform. Low-pass filtering the feedback signal, however, reduces the bandwidth and may result in rounding of the waveform valleys and/or other adverse effects caused by insufficient control loop bandwidth.

Random pulse width modulation (RPWM) may be used to reduce electromagnetic interference (EMI) from switching power converters. With RPWM, the switching frequency of the power converter is varied randomly to spread the spectrum of the switching noise, thereby reducing peaks at the primary switching frequency and harmonics thereof. Thus use of randomized switching frequencies in RPWM system introduces additional complications relating to the synchronization of the sampling with the switching which has implications for control loop bandwidth. Even in RPWM systems, however, the samples are typically low-pass filtered, thereby reducing the control loop bandwidth and causing degradation of system performance.

BRIEF DESCRIPTION OF THE DRAWINGS

FIG. 2 illustrates a buck converter.

FIGS. 3A-3C illustrate example current waveforms through various components of the buck converter of FIG. 2.

DETAILED DESCRIPTION

Cycle-by-Cycle Averaging

Some of the inventive principles of this patent disclosure relate to techniques for controlling a switching power converter by determining an average value of a measured parameter for substantially each switching cycle, and adjusting a control parameter during substantially each switching cycle in response to a corresponding one of the average values. For example, the measured parameter may be the output current of a buck converter, and the control parameter may be the duty cycle of the converter. Thus, the average value of the output current may be calculated on a cycle-by-cycle basis and used to adjust the duty cycle of the converter on a cycle-by-cycle basis. Depending on the implementation details, such a technique may eliminate the conventional low-pass filtering, thereby providing improved responsiveness and stability, and reduced distortion and/or noise as described in more detail below.

Figure 1:
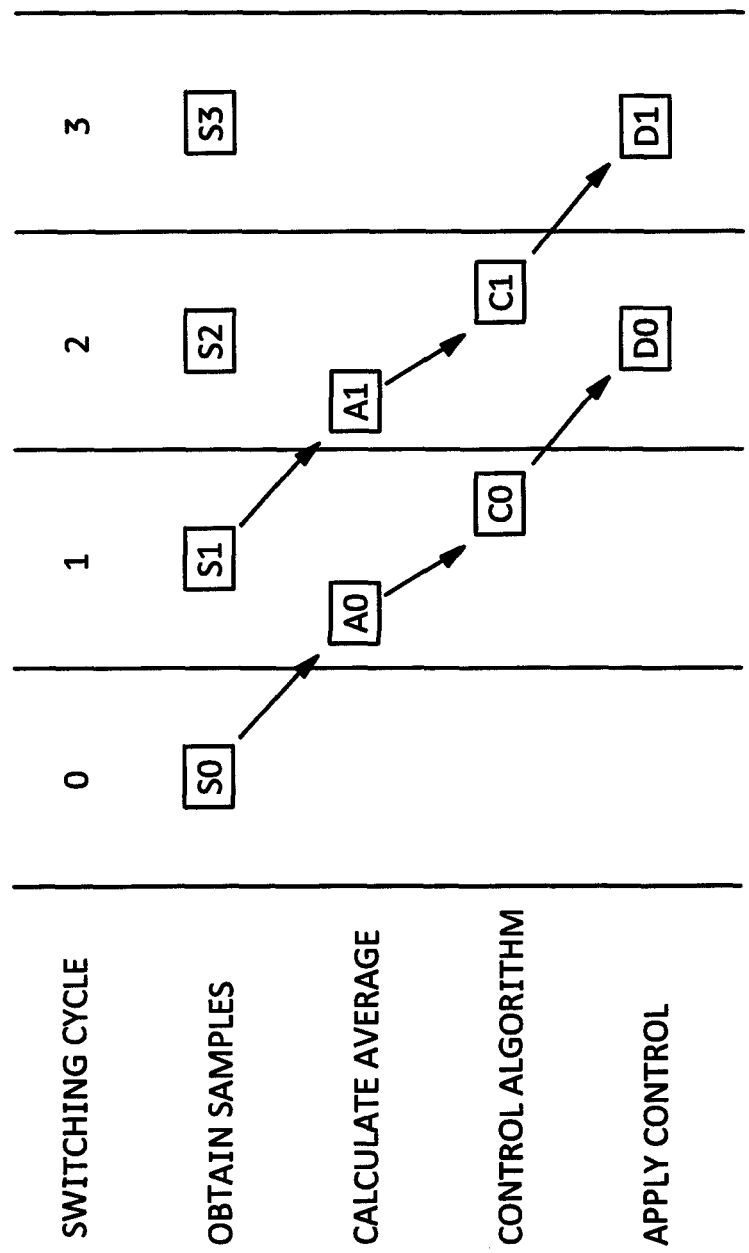
FIG. 1 illustrates an embodiment of a technique for controlling a switching power converter according to some inventive principles of this patent disclosure.

FIG. 1 illustrates an embodiment of a technique for controlling a switching power converter according to some inventive principles of this patent disclosure. During each switching cycle of the power converter, one or more samples $S_N$ of a measured parameter are obtained. An average value $A_N$ of the measured parameter is determined in response to the one or more samples $S_N$ for each switching cycle. The average value $A_N$ for each cycle is then used in a control algorithm $C_N$ such as a PID algorithm. The control algorithm adjusts a control parameter $D_N$ on a cycle-by-cycle basis in response to a corresponding average value $A_N$ for each cycle.

In the example of FIG. 1, the samples $S_0$ associated with the first switching cycle 0 are processed during cycle 1, and the corresponding adjustment to the control parameter $D_0$ is applied to the power converter during cycle 2. In other embodiments, however, the actions may be conducted during any suitable cycle or portion thereof. For example, if the system is implemented with signal processing hardware having enough bandwidth, the average value $A_0$ may be calculated and the control algorithm $C_0$ may be executed during cycle 0, and the adjusted control parameter $D_0$ may be applied to the power converter during cycle 1.

In accordance with the inventive principles, an average value of a measured parameter need only be determined for substantially each switching cycle, and the control parameter need only be adjusted during substantially each switching cycle. Thus, one or more actions may fall outside of a switching cycle. For example, with a randomized switching frequency, the samples associated with a cycle may not strictly be within a single switching cycle.

As discussed above, one example of a measured parameter is the output (inductor) current of a buck converter. Other examples of measured parameters include the input current to the converter, the input/output voltage, switch current, switch voltage, diode current/voltage, transformer voltage/current, instantaneous power, etc. Likewise, an example of a control parameter is the duty cycle of a switch in a buck converter, but other examples include switching frequency in a pulse frequency modulation (PFM) system, peak current in a current-mode converter, etc.

Averaging Based on Predictable Waveforms

Some additional inventive principles of this patent disclosure relate to the use of predictable waveforms coupled with relatively sparse sampling during a switching cycle to determine the value of a measured parameter for controlling a switching power converter. FIG. 2 illustrates a buck converter, while FIGS. 3A-3C illustrate example current waveforms through the switching transistor, freewheel diode and inductor, respectively. Since the general shape of these waveforms are known in advance, as may be the on and off times of the switching transistor, only one well-placed sample may be needed to determine an average value of any of these parameters during a switching cycle. For example, assuming the slope (di/dt=V/L) and on time of the switch (DD) are known, a single sample of the current through the switching transistor taken at time $T_S$ may be adequate to calculate the average value of the current for the switching cycle that includes $T_S$. The average value may then be used to adjust the switch duty cycle and regulate the input current to the buck converter as may be necessary, for example, for applications requiring input power factor correction.

Thus, a switching power converter may be controlled by determining a value of the measured parameter in response to the waveform of the measured parameter for substantially each switching cycle, and adjusting the control parameter during substantially each switching cycle in response to a corresponding one of the average values.

Dynamic Linearization and De-Linearization

Some additional inventive principles of this patent disclosure relate to the use of dynamic linearizing and de-linearizing of signals to and from a switching power converter.

Figure 4:
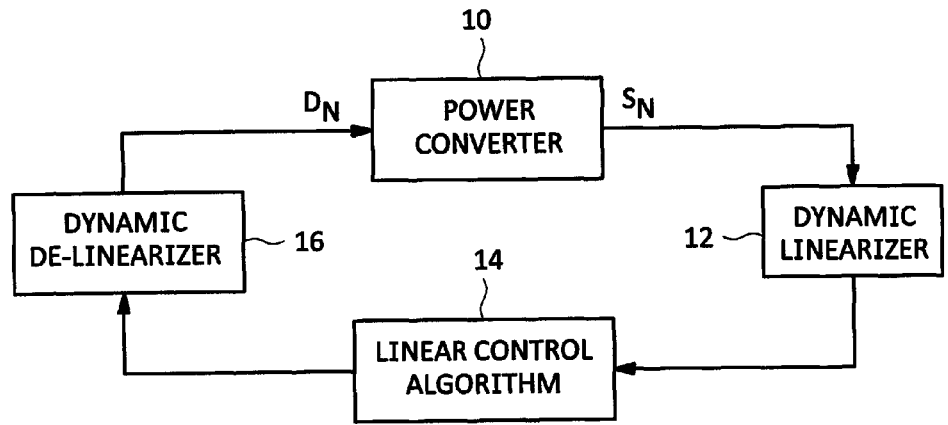
FIG. 4 illustrates an embodiment of a control system for a switching power converter according to some inventive principles of this patent disclosure.

FIG. 4 illustrates an embodiment of a control system for a switching power converter according to some inventive principles of this patent disclosure. In the embodiment of FIG. 4, the power converter 10 has one or more nonlinear operating characteristics. A controller 14 implements a linear control algorithm such as a proportional-integral-derivative (PID) control algorithm. To enable the nonlinear converter 10 to work with a linear controller 14, a linearizer 12 is included to linearize one or more measured feedback parameters $S_N$. Likewise, a de-linearizer 16 is included to convert the output of the controller 14 back to a nonlinear form $D_N$ suitable for the power converter 10.

Unlike conventional linearizers and de-linearizers, one or both of the linearizer 12 and de-linearizer 16 provides dynamic linearizing or de-linearizing operation. That is, the measured parameter $S_N$ may be dynamically linearized in response to one or more additional measured parameters of the switching power converter. For example, if the measured parameter $S_N$ is output current, the one or more additional measured parameters may include input and/or output voltage. Similarly, the control parameter $D_N$ may be dynamically de-linearized in response to one or more additional measured parameters of the switching power converter.

Example System

An example embodiment of a system that implements several inventive principles of this patent disclosure is described below. For purposes of illustration, some example implementation details are described in the context of a buck converter, but the inventive principles are not limited to these example details.

A buck system uses inductance and fast electronic switching to efficiently convert a high voltage (+Vin), low current power source to almost the same power at a lower voltage (i.e. +Vout<+Vin) across a load, with a correspondingly higher current into the load. If the switch on-voltage drop, inductor resistance, and diode voltage drop are all small, power conversion efficiencies approaching 100% are possible.

In the example embodiment, the buck control system controls current injection into a load. This type of current-injection technique may have applications, for example in an inverter system that delivers power to an AC grid. According to some of the inventive principles, the system does not require low-pass filtering of the measured load current in order to compare it with a target current reference. Therefore, it can provide faster control of the buck system which may increase responsiveness and stability, and reduce distortion and noise into the output load. Furthermore it may be ideally suited to a digital implementation because of the arithmetic operations required in its implementation. A digital implementation can eliminate several analog components, particularly in a digital signal processor (DSP) or field programmable gate array (FPGA) where multiple analog-to-digital converters (ADCs) and pulse-width modulators (PWMs) are available for minimal extra cost and circuit board area.

In a buck system as shown in FIG. 2, a target current, which may be a function of time (e.g. a sinusoidal function of time in an inverter) can be compared with the average instantaneous current measured through the output load on a cycle-by-cycle basis, and the resulting difference can be used to control the fractional on-time DD of the switch, so that the average current closely follows the target current.

The following equations illustrate a technique for developing an expression for estimating the average output current from a buck converter on a cycle-by-cycle basis according to some inventive principles of this patent disclosure. This technique initially assumes the converter operates in continuous conduction mode and takes advantage of the relatively predictable nature of the current waveforms during each cycle.

Figure 5:
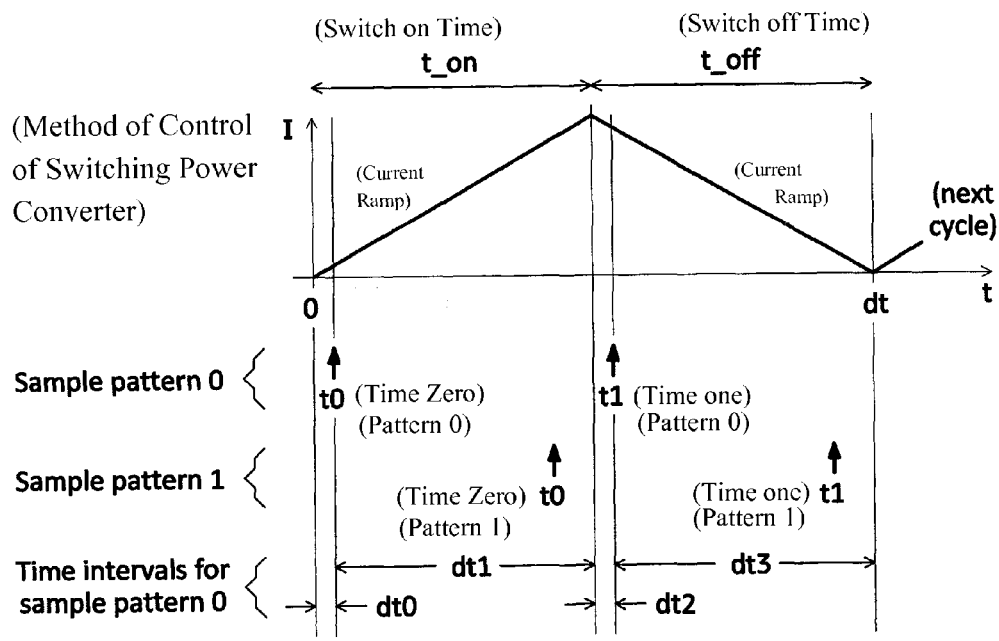
FIG. 5 illustrates an embodiment of a method for controlling a switching power converter according to some inventive principles of this patent disclosure.

Referring to the waveform of FIG. 5, the rate of change of the current through the inductor during the switch on time (di_on) is the slope g0 during the switch on time and is given by:

$$di\_on = g0 = (Vin - Vtrans - Vout) * t\_on / buck\_L \quad \text{(Eq. 1)}$$

where buck_L is the inductance of the output inductor and t_on is the on time of the switch. The rate of change of the current through the inductor during the switch off time (di_off) is the slope g1 during the switch on time and is given by:

$$di\_off = g1 = (Vout - Vdiode) * t\_off / buck\_L \quad \text{(Eq. 2)}$$

The total cycle time dt is given by:

$$dt = t\_on + t\_off \quad \text{(Eq. 3)}$$

and the PWM on-ratio DD may be defined as:

$$DD = t\_on / dt \quad \text{(Eq. 4)}$$

so that 0<=DD<=1.

At equilibrium, di_on=di_off, and the system produces current ramps as shown in FIG. 5 which illustrates two different sample patterns (pattern 0 and pattern 1), and also illustrates time intervals for pattern 0 where: dt0=t0, dt1=t_on−t0, dt2=dt/2−dt1; dt3=dt−t1; and t1=t0+dt/2 in both sample pattern cases.

Figure 6:
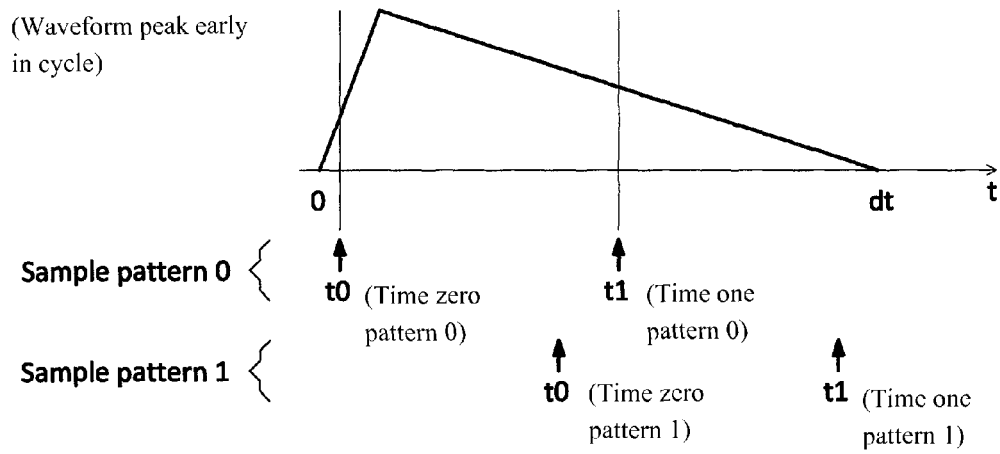
FIG. 6 illustrates an example in which the peak of the waveform of FIG. 5 occurs earlier in the cycle.
Figure 7:
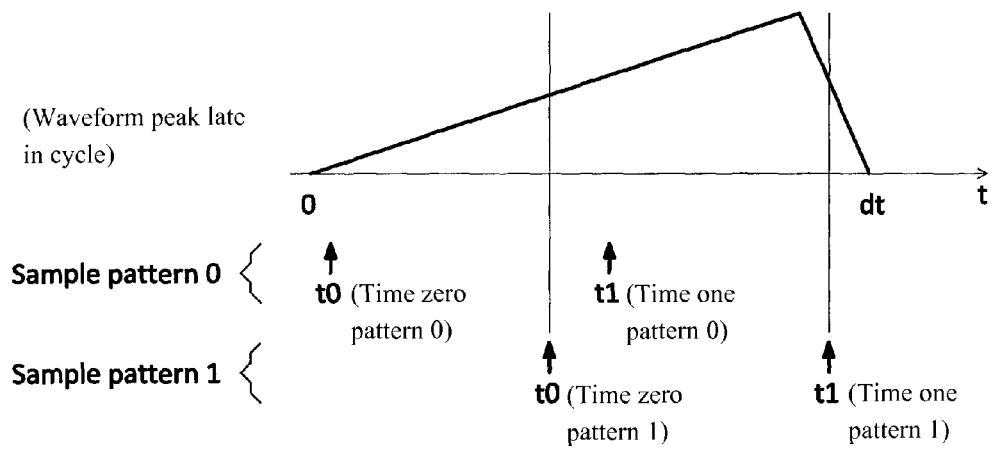
FIG. 7 illustrates an example in which the peak of the waveform of FIG. 5 occurs later in the cycle.

In accordance with some of the inventive principles, the above alternative sample patterns may be used to find the average buck current, I_avg, so that it can be compared with an ideal or target current on a cycle-by-cycle basis to control the output current from the power converter. In this example, two alternative sample patterns are utilized because the two alternatives may enable both the upward and downward sloping portions of the waveform to be sampled during each cycle regardless of the location of the peak in the waveform. For example, if the peak of the waveform occurs early in the cycle as shown in FIG. 6, sample pattern 0 enables both portions of the waveform to be sampled adequately. Alternatively, if the peak occurs late in the cycle as shown in FIG. 7, sample pattern 1 should be used to assure that both portions of the waveform are sampled correctly.

For both sample patterns, t1−t0=dt/2, so for each pattern, the current can be sampled at 2/dt Hz using 2 ADCs or a single ADC with two sample-and-hold timers, one for each pattern.

A parameter frac_dt may be defined to place a limit on how early the first sample may occur at time t0. For example, with sample pattern 0, t0=frac_dt time after t_on starts. This limit may be useful to assure that switching transients that occur at the peaks and valleys of the current waveform have time to settle before the waveform is sampled. The parameter frac_dt may be set large enough to allow settling after a t_off to t_on transition (at time 0 in FIG. 5). However it may also be set small enough to give an accurate approximation to the true I_avg if t_on<frac_dt for sample pattern 0, or t_off<(dt−t1) for sample pattern 1. In some embodiments, a value of frac_dt=0.04*dt may provide good results.

The following is an example analysis of the average approximation according to some inventive principles of this patent disclosure. From knowing the slopes g0 and g1 in FIG. 5, and the intercepts at t0, t1, then lines are uniquely defined, with an intercept at I_max:

$$i0+g0*dt1=i1-g1*dt2=i1-g1*(dt/2-dt1) \quad (Eq.\ 5)$$

where i0 and i1 are the sampled values of the current at times t0 and t1, respectively. Collecting terms in dt1 yields:

$$dt1=(i0-i1+g1*dt/2)/(g1-g0) \quad (Eq.\ 6)$$

Similarly, for a repetitive waveform, dt0=dt4 for the next cycle, so that at I_min:
terms in dt1 yields:

$$i1+g1*dt3=i0-g0*dt0=i0-g0*(dt/2-dt3) \quad (Eq.\ 7)$$

And therefore:

$$dt3=(i1-i0+g0*dt/2)/(g0-g1) \quad (Eq.\ 8)$$

Because I_max=i0+g0*dt1, and I_min=i1+g1*dt3, equations (6) and (8) give:

$$(I\_max+I\_min)/2=I\_avg=((i0+i1)+g1*(i1-i0+g0*dt/2)/(g0-g1)+g0*(i0-i1+g0*dt/2)/(g1-g0))/2 \quad (Eq.\ 9)$$

which may be simplified to:

$$I\_avg=((i0+i1)+(g0+g1)(i1-i0)/(g0-g1))/2 \quad (Eq.\ 10)$$

Using equations (1) and (2), and assuming Vtrans and Vdiode are zero, g0 and g1 may be eliminated:

$$I\_avg=(i0+i1)/2+(V\_in-2*V\_out)(i1-i0)/(2*Vin) \quad (Eq.\ 11)$$

This result is independent of the sample positions and buck inductance, and is valid as long as t1=t0+dt/2 and is accurate if t0<=t_on<=t1. Equation (11) can be split into two components:

$$I\_avg=I\_simple\_avg+I\_correction \quad (Eq.\ 12)$$

where:

$$I\_simple\_average=(i0+i1)/2 \quad (Eq.\ 13)$$

and $$I\_correction=(i1-i0)/2*(V\_in-2*V\_out)/V\_in \quad (Eq.\ 14)$$

The correction component I_correction is nonlinear with respect to voltage. Moreover, it is dynamically nonlinear in that it depends on the values of the input voltage V_in and the output voltage V_out which may change as functions of time.

A potential benefit of the sample placement techniques described above and below is that it may reduce the required sample rate, and therefore, processing overhead, power consumption, etc.

Sample Code

Appendix A illustrates an example of code that may be used to calculate the patterns, determine the corresponding sample positions, etc. Although the operation of the sample code will be readily apparent, some additional commentary will be provided here.

The first if/else structure in the sample is used to determine whether sample pattern 0 or 1 should be used. In this example, the determination is based on the relative values of Vin and Vout. That is, the point at which Vin=Vout*0.5 may provide a good approximation of when the peak of the current waveform occurs near the middle of the switching cycle, and therefore, may serve as a good threshold for toggling between pattern 0 and pattern 1.

The following code segment essentially performs a linearization operation on the sampled output from the buck converter to enable the use of a linear control algorithm as described below.

```
double i0=state→i0;
double i1=state→i1;
double I_simple_avg=(i1+i0)*0.5;
double I_corr=(i1-i0)*0.5*(V_in-2.0*V_out)/V_in;
double I_avg=I_simple_avg+I_corr;
```

The term I_avg is linearly related to the current, but includes nonlinearities related to V_in and V_out.

The next code segment is essentially a linear PID control algorithm.

```
/* find the error current from the target current */
double i_error=state→target_load_inject_I-I_avg;
/* process integration term for a PID feedback control system */
err_integrate+=i_error;
double limit=state→buck_integrate_windup_limit;
/* limit integral wind-up */
if(err_integrate<-limit)
err_integrate=-limit;
else if(err_integrate>limit)
err_integrate=limit;
double err_delta=i_error-prev_i_error;
prev_i_error=i_error;
/* feedback control values found experimentally */
double k1=(double) 0.3; /* overall gain */
```

```
double k2=(double) 0.2; /* relative integral gain */
double k3=(double) 0.02; /* relative differential gain */
double    feedback=k1*(i_error+k2*err_integrate+
k3*err_delta);
```

Finally, the next code segment performs a de-linearization operation on the results of the PID algorithm. The last four lines of this segment performs a limiting operation (0<=DD<=1) that may be modified to provide any suitable range of values for DD.

```
/* an error in buck_L value here is a scaling error, which is
   "fixed" by the feedback loop and doesn't give a DC error
   */
DD=(V_out+(feedback*state→buck_L_over_dt))/V_in;
if(DD<(double) 0.0)
    DD=(double) 0.0;
else if(DD>(double) 1.0)
    DD=(double) 1.0;
```

Thus, the code includes a first nonlinear section that linearizes the outputs from the power converter, a linear section to implement a linear control algorithm, and a second nonlinear section to de-linearize the input back to the power converter. Moreover, the two nonlinear sections are dynamically nonlinear in that they respond to one or more additional measured parameters of the power converter, in this example, the input and output voltages. This dynamically nonlinear operation may enable the control system to provide improved response time, lower noise, reduced distortion and/or higher stability.

Figure 8:
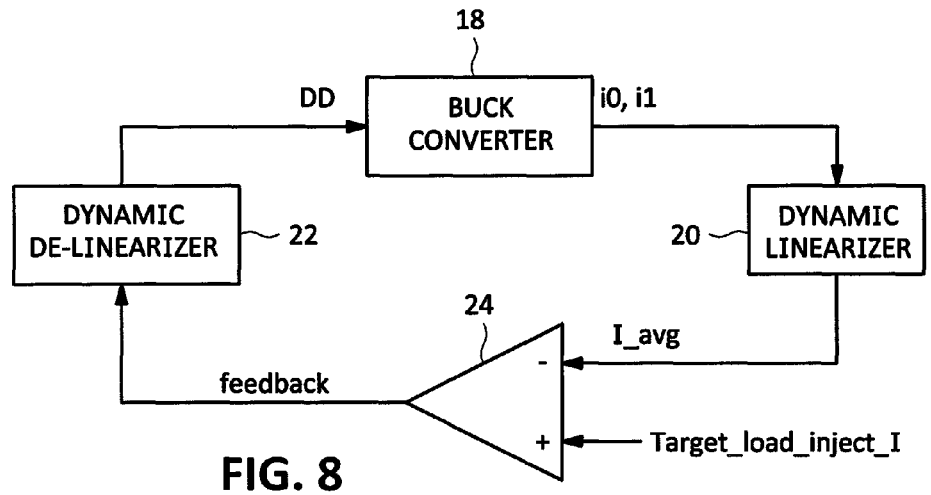
FIG. 8 is a block diagram that graphically illustrates how a control system for a power converter may be implemented with the sample code described above according to some inventive principles of this patent disclosure.

FIG. 8 is a block diagram that graphically illustrates how a control system for a power converter may be implemented with the sample code described above according to some inventive principles of this patent disclosure. The parameters identified in FIG. 8 correspond to the parameters included in the sample code. The dynamic linearization functionality 20 is implemented with the first nonlinear code section, the dynamic de-linearization functionality is implemented with the second nonlinear code section, and the error amplifier 24 is implemented with the linear PID code section. In this example, the input and output voltages V_in and V_out may be viewed as inputs that adjust the dynamics of the nonlinear blocks 20 and 22.

A potential benefit of the techniques described above is that they may provide a more sophisticated solution that results in improved system performance. For example, prior art systems have utilized relatively crude corrections to make the duty cycle DD relate to the error integral in a simplistic manner. However, the inventive principles of this patent disclosure may enable linearizing and de-linearizing by changing the loop dynamics in response to different power levels and/or other operating parameters, thereby providing improved performance.

Multi-Phase Converters

Some additional inventive principles relate to the use of cycle-by-cycle averaging with multi-phase power converters.

To provide higher power ratings while reducing system costs, multi-phase power converters utilize multiple parallel converters that operate at different phases. The converter for each phase is relatively small, and therefore, inexpensive. However, the outputs from the multiple converters are combined in parallel to provide a greater overall power rating, but at a lower cost and in a more compact system than for a single converter having the same power rating.

Figure 9:
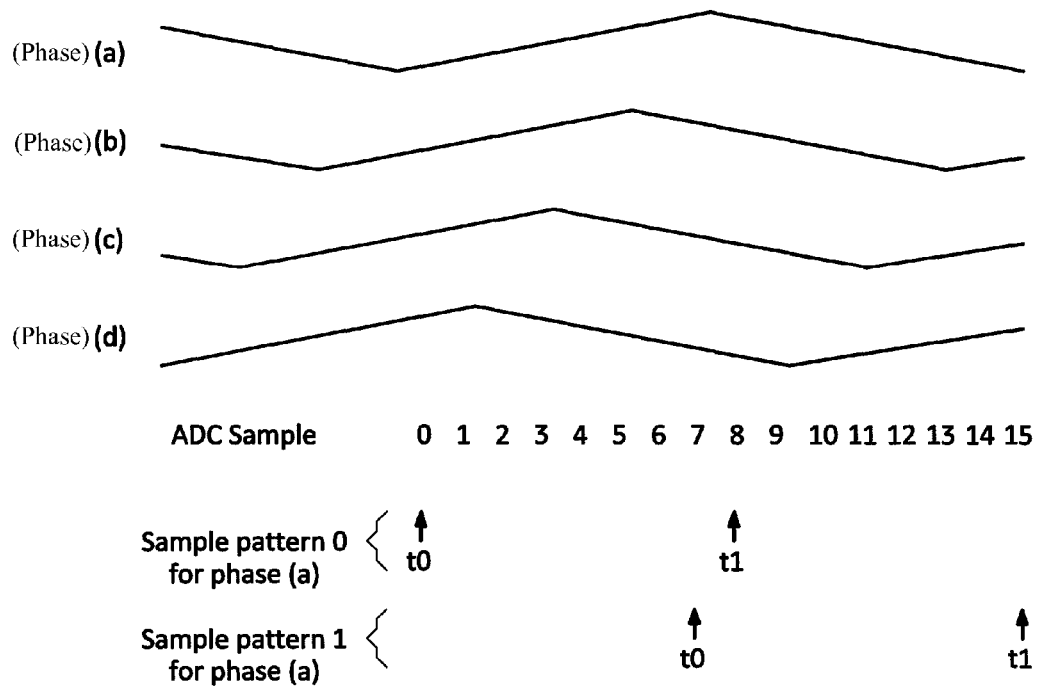
FIG. 9 illustrates how a controller for a multi-phase system may be integrated with a controller according to some inventive principles of this patent disclosure.

FIG. 9 illustrates how a controller for a four-phase buck system may be integrated with a single ADC to provide a synergistic result using shared resources. In the example of FIG. 9, the single ADC may be arranged to sample the outputs at sixteen different points 0-15 during a cycle. Phase (a) may utilize the samples 0 and 8 for pattern 0 and samples 7 and 15 for pattern 1. However, phases (b), (c) and (d), which are offset from phase (a) as shown in FIG. 9, may utilize other combinations of samples from the ADC. The control algorithms for all four phases may also be implemented with a single DSP or FPGA, thus providing further efficiencies and cost benefits.

Random PWM

Some addition inventive principles of this patent disclosure relate to the use of cycle-by-cycle averaging in combination with a randomized PWM or other switching technique.

As discussed above, in a random PWM strategy, the frequency of the PWM waveform is changed from one cycle to the next. This causes the cycle-to-cycle PWM period to be different. Such strategies are useful for reducing Electro-Magnetic Interference (EMI) radiation from the power converter. The sampling duration of the analog-to-digital converter used for converting the sensed analog signals to digital form is synchronized with the dynamic duration of the PWM period. In some embodiments the methods proposed in this invention disclosure can use variable sampling durations synchronized to the variable PWM period.

Although conventional randomization techniques can help reduce EMI to a certain extent, the approach may cause significant difficulties due to the variable time duration available in the digital signal processor or microcontroller to determine the next control vector to be driven to the PWM. Moreover, creation of the variable width clock signals for ADC may become complicated and significantly interfere with the latency requirements of the control loops. In high-resolution applications ADC conversion accuracy can be significantly degraded due to clock modulation. Typical DSPs with on-die ADCs operate synchronously with the system clock and not with the variable PWM period. In such situations it may become imperative to use a fixed sampling duration for the ADC. Such de-correlation of sampling duration from the variable PWM period may also cause significant improvement in EMI performance.

In accordance with some of the inventive principles of this patent disclosure, a fixed sampling frequency can be used along with the variable PWM period since the average value determination may be independent of the sample positions. This may cause the relative positions of sample patterns within the sampling duration to be varied from one period to the next.

Further improvements may be realized by using asynchronous sampling relative to variable period PWM operation according to some additional inventive principles of this patent disclosure. In a system using a fixed sampling frequency along with the variable PWM period, there may be specific limitations on the choice of sampling frequencies such that sample pattern 0, and sample pattern 1 fall within the previously described constraints. This may also require ADC sampling rates that are sufficiently high. Such constraints can be completely eliminated by using asynchronous sampling relative to variable period PWM operation. This can be accomplished by using one or more of the following parameters: (1) duty cycle of the PWM; (2) relative position of the sampling edge from the start of the PWM period (or any other edges of the PWM waveform); (3) the on- or off-state of the power switch; and/or (4) the state of the inductor current, which may be made available through ultra-low latency circuits such as comparators. These are available from the parametric configuration and the control system running inside a digital signal processor or a microcontroller.

Buck efficiency enhancement may be important under light-load conditions. Such enhancements can be accomplished by using pulse frequency modulation (PFM) in which the pulse on-time is kept constant from one pulse to the next. However, the total number of pulses per unit time is varied. In other words, pulse frequency is changed over longer durations. In situations similar to a random PWM strategy, coherent schemes may be used to sample the current. The inventive principles provided by the patent disclosure may be used directly in such schemes. Although such schemes can cause critical EMI issues, the inventive principles disclosed above may enable the implementation of synchronous schemes with PFM, thereby allowing significant mitigation of EMI.

Furthermore, the inventive principles described herein may enable a system to obtain quick average current estimates under skip- and burst-modes of operation. In a skip mode of operation, the converter allows skipping cycles when they are not needed. In a burst mode, the converter can completely turn-on and turn-off the loop periodically. The durations of off and on-states are determined by the load conditions. In such operations, a converter can go into a discontinuous mode of operation. Irrespective of such situations, the inventive principles disclosed here may continue to provide the quickest way to estimate the average current and therefore allow rapid response to varying load and/or source conditions.

APPENDIX

Appendix A illustrates an example of code according to some inventive principles of this patent disclosure.

The inventive principles of this patent disclosure have been described above with reference to some specific example embodiments, but these embodiments can be modified in arrangement and detail without departing from the inventive concepts. For example, some of the embodiments have been described in the context of synchronous logic, but the inventive principles may be applied to embodiments that employ asynchronous logic as well. Such changes and modifications are considered to fall within the scope of the following claims.

Appendix A

```
if(Vin<Vout*0.5)
{
/*
  * sample pattern 0: first sample timed just after the start
      of a
  * PWM cycle, second sample timed just after ½ a PWM
      cycle.
  */
  t0=frac_dt;
  t1=dt*0.5+frac_dt;
}
else
{
/*
  * sample pattern 1: first sample just before the start of the
  * second half of a PWM cycle, second sample just before
      the start
  * of the next PWM cycle.
  */
  t0=dt*0.5-frac_dt;
  t1=dt-frac_dt;
}
```

The values t0 and t1 are then used to set the sampling pattern 0 or 1 defined above in FIG. 2.

```
/* C code for control loop to control DD so that:
   I_avg(measured)=state->target_load_inject_I */
/*
 * Input: double state->buck_integrate_windup_limit
 * Input: double state->buck_L_over_dt (buck L/time-step)
 * Input: double state->DC_link_cap_V
 * Input: double state->i0 (load current at t0)
 * Input: double state->i1 (load current at t1)
 * Input: double state->load_V (H-bridge load voltage)
 * Input: boolean state->output_on
 * Input: double state->target_load_inject_I
 * Output: double DD
 */
double Inverter_Calc_DD(Digital_State *state)
{
   static double err_integrate=0.0;
   static double prev_i_error=0.0;
   double DD=0.0;
   double V_in=state->DC_link_cap_V;
   double V_out=fabs(state->load_V);
   if((V_in >V_out) && (V_out>0) && state->output_on)
   {
      /*
       * the above conditions also ensure that V_in >0 so we
       * don't divide by zero below. For I_avg, see Equations
         (12-14).
       */
      double i0=state->i0;
      double i1=state->i1;
      double I_simple_avg=(i1+i0)*0.5;
      double I_corr=(i1-i0)*0.5*(V_in -2.0*V_out)/V_in;
      double I_avg=I_simple_avg+I_corr;
      /* find the error corrent from the target current */
      double i_error=state->target_load_inject_I-I_avg;
      /* process integration term for a PID feedback control
         system */
      err_integrate+=i_error;
      double limit=state->buck_integrate_windup_limit;
      /* limit integral wind-up */
      if(err_integrate<-limit)
         err_integrate=-limit;
      else if(err_integrate>limit)
         err_integrate=limit;
      double err_delta=i_error-prev_i_error;
      prev_i_error=i_error;
      /* feedback control values found experimentally */
      double k1=(double) 0.3; /* overall gain */
      double k2=(double) 0.2; /* relative integral gain */
      double k3=(double) 0.02; /* relative differential gain */
      double     feedback=k1*(i_error+k2*err_integrate+
         k3*err_delta);
      /* an error in buck_L value here is a scaling error, which
         is "fixed" by the feedback loop and doesn't give a DC
         error */
      DD=(V_out+(feedback*state->buck_L_over_dt))/
         V_in;
      if(DD<(double) 0.0)
         DD=(double) 0.0;
      else if(DD>(double) 1.0)
         DD=(double) 1.0;
   }
   return(DD);
}
```

The invention claimed is:

1. A method comprising:
   operating a switching power converter having switching cycles, a control parameter, and a first measured parameter;
   determining an average value of the first measured parameter for substantially each switching cycle,
   linearizing the average value of the first measured parameter in response to a second measured parameter;
   the linearized average value of the first measured parameter for use by a control algorithm of a controller to adjust the control parameter during substantially each switching cycle in response to a corresponding one of the average values;
   de-linearizing the adjusted control parameter in response to the second measured parameter; and
   applying the adjusted control parameter to the switching power converter.

2. The method of claim 1 where:
   the control parameter comprises a switch duty cycle; and
   the first measured parameter comprises an output current.

3. The method of claim 1 where determining the average value of the first measured parameter comprises:
   obtaining a first sample of the first measured parameter during a switching cycle; and
   calculating the average value of the first measured parameter during the switching cycle in response to the first sample.

4. The method of claim 1 where the average value of the first measured parameter includes a correction component.

5. The method of claim 1 further comprising linearizing a control loop including the switching power converter.

6. The method of claim 1 where:
   the switching power converter includes multiple phases, each phase having switching cycles, a control parameter, and a measured parameter; and
   the method further comprises:
   determining an average value of the measured parameter for substantially each switching cycle for each phase; and
   adjusting the control parameter for each phase during substantially each switching cycle in response to a corresponding one of the average values.

7. The method of claim 1, further comprising determining the average value for the first measured parameter for each of a plurality of phases within the switching power converter, wherein each phase has switching cycles.

8. The method of claim 3 where the average value is calculated in response to a waveform of the first measured parameter.

9. The method of claim 3 where determining the average value of the first measured parameter further comprises:
   obtaining a second sample of the first measured parameter during the switching cycle; and calculating the average value of the first measured parameter during the switching cycle in response to the second sample.

10. The method of claim 3 where:
    each switching cycle includes one or more switching points; and
    the first sample is obtained at a point in the switching cycle that avoids the one or more switching points.

11. The method of claim 3 further comprising randomizing the switching cycles.

12. The method of claim 3 where calculating the average value of the first measured parameter comprises:
    performing a first nonlinear control operation in response to the first measured parameter and one or more additional measured parameters, thereby generating a first result;
    performing a linear control operation in response to the first result, thereby generating a second result; and
    performing a second nonlinear control operation in response to the second result.

13. The method of claim 4 where the correction component comprises a nonlinear component.

14. The method of claim 5 where linearizing the control loop comprises changing the dynamics of the control loop in response to one or more operating conditions of the switching power converter.

15. The method of claim 7, further comprising adjusting the control parameter for each phase during substantially each switching cycle in response to a corresponding one of the average values.

16. The method of claim 8 where the average value is calculated in response to a slope of the waveform of the first measured parameter.

17. The method of claim 9 where the average value is calculated in response to a first slope and a second slope of the first measured parameter.

18. The method of claim 9 where:
    the first and second samples are obtained in two or more sample patterns; and
    the method further includes selecting one of the two or more sample patterns in response to the location of a switching point in a switching cycle.

19. The method of claim 13 where the correction component is nonlinear relative to the second measured parameter.

20. The method of claim 13 where the nonlinear component is adapted to compensate for one or more nonlinearities in the switching power converter.

21. The method of claim 14 where the one or more operating conditions includes a voltage and/or current in the switching power converter.

22. The method of claim 11 further comprising synchronizing the first sample with the switching cycles.

23. The method of claim 11 further comprising de-correlating the first sample with the switching cycles.

24. The method of claim 11 further comprising obtaining the first sample asynchronously relative to a parameter of the switching cycles.

25. The method of claim 12 where the linear control operation comprises a PID control operation.

26. The method of claim 19 where:
    the first measured parameter comprises an output current; and
    the second measured parameter comprises an input voltage or an output voltage.

27. The method of claim 24 where the parameter includes one or more of a PWM duty cycle, a relative position of a sampling edge from an edge of a PWM period, a state of a power switch, or the current flowing through an inductor in the switching power converter.

28. A method comprising:
    controlling a switching power converter by generating a control parameter to control the switching power converter in response to a first measured parameter of the switching power converter, the first measured parameter being non-linear;
    dynamically linearizing the first measured parameter in response to a second measured parameter;
    performing a linear control operation on the linearized first measured parameter; and dynamically de-linearizing the previously linearized first measured parameter in response to the second measured parameter.

29. The method of claim 28 where the first measured parameter is dynamically linearized in response to the second measured parameter having one or more additional measured parameters of the switching power converter.

30. The method of claim 28 where the control parameter is dynamically de-linearized in response to the second measured parameter having one or more additional measured parameters of the switching power converter.

31. The method of claim 29 where:
the first measured parameter comprises an output current; and
the one or more additional measured parameters comprise an input voltage and an output voltage.

32. The method of claim 30 where:
the first measured parameter comprises an output current; and
the one or more additional measured parameters comprise an input voltage and an output voltage.

33. A method comprising:
operating a switching power converter having switching cycles, a control parameter, and a first measured parameter;
determining an average value of the first measured parameter for substantially each switching cycle by measuring a value of the first measured parameter at a predetermined cycle time, the first measured parameter having a predictable waveform;
linearizing the average value of the first measured parameter in response to a second measured parameter;
adjusting the control parameter during substantially each switching cycle in response to a corresponding one of the determined average values of the first measured parameter;
de-linearizing the adjusted control parameter in response to the second measured parameter; and
applying the adjusted control parameter to the switching power converter.

34. The method of claim 33 where the waveform of the first measured parameter comprises:
a first portion having a first slope; and
a second portion having a second slope.

35. The method of claim 33 where the value of the first measured parameter comprises an average value of the first measured parameter.

36. A system comprising:
a controller adapted to control a switching power converter by generating a control parameter in response to a first measured parameter of the switching power converter;
where the controller includes functionality to determine an average value of the first measured parameter for substantially each switching cycle of the switching power converter;
a linearizer adapted to linearize the average value of the first measured parameter according to a second measured parameter, and further adapted to provide the linearized first measured parameter to the controller;
where the controller includes a control algorithm using the determined average value for input to adjust the control parameter during substantially each switching cycle in response to a corresponding one of the average values;
a de-linearizer adapted to de-linearize the control parameter using the second measured parameter after the control parameter has been used in the control algorithm of the controller; and
where the controller includes functionality to apply the adjusted control parameter to the switching power converter.

37. The system of claim 36 where the controller is adapted to:
obtain a first sample of the first measured parameter during a switching cycle; and calculate the average value of the first measured parameter during the switching cycle in response to the first sample.

38. The system of claim 36 where the linearizer is integral with the controller.

* * * * *